United States Patent [19]

Dennis

[11] Patent Number: 5,419,282
[45] Date of Patent: May 30, 1995

[54] LITTER SIFTER TRAY WITH ANGULARLY ADJUSTABLE SIDE WALLS

[76] Inventor: Glenn F. Dennis, 983 River Rd., Johns Island, S.C. 29455

[21] Appl. No.: 119,621

[22] Filed: Sep. 13, 1993

[51] Int. Cl.$^6$ .................................... A01K 29/00
[52] U.S. Cl. ............................ 119/166; 119/168; 229/186
[58] Field of Search ................ 119/166, 167, 168; 209/408; 229/119, 120, 186, 188

[56] References Cited

U.S. PATENT DOCUMENTS

| | | | |
|---|---|---|---|
| D. 233,158 | 10/1974 | Lowe, Jr. | D30/99 |
| D. 256,173 | 7/1980 | Rigney | D30/99 |
| D. 289,095 | 3/1987 | Chiodo et al. | 119/166 |
| 641,722 | 1/1900 | McCandless | 229/120 |
| 1,717,733 | 6/1929 | Prati | 229/120 |
| 1,974,061 | 9/1934 | Densen | 229/120 |
| 2,033,285 | 3/1936 | Harvey | 229/119 |
| 3,141,441 | 7/1964 | Russell | 119/166 |
| 3,332,397 | 7/1967 | Vander Wall | 119/166 |
| 3,899,121 | 8/1975 | Herbetko | 229/120 |
| 4,142,665 | 3/1979 | Jewell et al. | 229/120 |
| 4,217,857 | 8/1980 | Geddie | 119/166 |
| 4,312,295 | 1/1982 | Harrington | 119/167 |
| 4,325,822 | 4/1982 | Miller | 209/251 |
| 4,723,510 | 2/1988 | Skillestad | 119/167 |
| 4,802,442 | 2/1989 | Wilson | 119/166 |
| 4,817,560 | 4/1989 | Prince et al. | 119/166 |
| 4,870,924 | 10/1989 | Wolfe | 119/167 |
| 5,012,765 | 5/1991 | Naso et al. | 119/166 |
| 5,076,627 | 12/1991 | Simon | 294/1.3 |
| 5,207,772 | 5/1993 | Lauretta et al. | 119/167 |

*Primary Examiner*—Todd E. Manahan

[57] ABSTRACT

A cat litter box sifter comprises (1) a rectangular tray bottom with perforations extending throughout the length and width dimensions of said tray bottom and (2) four side walls, each extending upwardly from one respective side edge of the rectangular tray with perforations extending throughout the length and width dimensions of each side wall. Multiple trays are assembled from a preformed litter sifter sheet material and nested together in a cat box below the level of granular litter material within the cat box. Single trays can be removed successively to effectively remove fecal matter without also removing the granular litter material, thus extending its duration of use.

15 Claims, 3 Drawing Sheets

LITTER SIFTER TRAY WITH ANGULARLY ADJUSTABLE SIDE WALLS

BACKGROUND OF THE INVENTION

1. Field of the Invention

The present invention relates to cat litter box hygiene and, in particular, to the screening and disposal of fecal matter from granular cat litter material. More particularly, the present invention relates to an improved cat litter screening device which, when nested multiples of the invention device are placed within a cat box intermediate of the litter material within the box and the bottom of the box, permits repeated removal of said fecal matter from the granular litter, thus extending the duration of use of the litter.

2. Description of the Prior Art

This invention represents an improvement over various prior art methods and devices which have as their object a similar attempt to prolong the useful life of granular litter. Among the devices conventionally used for this purpose are spoons, trowels, and small shovels. Special devices sold in pet stores include plastic shovels or sieves formed with narrow slots which collect the fecal matter as the shovel blade is pushed through the litter material, which material escapes capture by exiting through the slots and remaining in the litter box. Examples of these shovel/scoops are disclosed in U.S. Pat. Nos. Des. 233,158 (Lowe, Jr.), Des. 256,173 (Rigney), and 5,076,627 (Simon). Also, a "dry excreta removing sieve" is taught in the odorless cat toilet of U.S. Pat. No. 3,332,397 (Wall). These conventional spoons, trowels, shovels, and other devices have a number of disadvantages and drawbacks. The size of these devices requires several swipes to collect and dispose of all the fecal matter, and many pet owners find it difficult to use such devices successfully. Often, the use of these conventional devices results in some of the fecal matter being inadvertently left in-the litter. Also, the soiled spoon, trowels, shovels, and related devices are unsightly when stored near the litter box. These drawbacks led to the use of larger litter sifter devices.

The concept of using-a broad litter sifter is old, as taught in U.S. Pat. Nos. 3,141,441 (Russell), 4,217,857 (Geddie), and 4,312,295 (Harrington). These references, however, do not teach stacking plural litter sifting trays (screens) inside a litter box. They neither teach nor suggest stacking a plurality of litter sifter trays of the type disclosed herein in a litter box. Specifically, Geddie discloses only a single sifter tray positioned on top of another solid tray which itself sits nested atop another solid tray. Upon removing fecal matter from sand or litter material in the first solid tray by removing the sifter tray therefrom, the first solid tray is removed from the second solid tray in which the emptied sifter tray is placed. Then, the sand or litter material is poured from the first solid tray into the second, and the sifter tray and second solid tray combination is nestably placed atop said first solid tray. Thus, multiple litter boxes are taught, rather than multiple litter sifters.

Harrington teaches an even more complicated arrangement of a series of stacked flexible, thin plastic sieve sheets with perforations (such as "a multi-slit vegetable bag material"), at the bottom of which is an impervious sheet for removal of all matter in the box after the sieve sheets are exhausted. Also, these series of sheets are fastened to an underlying cardboard form which, in turn, is securable to the bottom of the litter box.

Another prior art device intended to facilitate fecal matter removal from cat litter boxes while retaining the granular litter material for continued use is taught in U.S. Pat. No. 4,802,442 (Wilson). Unlike either Geddie or Harrington, Wilson does teach a litter sifter device intended to be embedded beneath the surface of the litter material in the cat box with side panels which also are perforated. The bottom panel of the sifter device, however, is designed to fold during the removal procedure, which limits the number of side panels to two. Absent four side panels to form an enclosure, there is great risk of spilling the fecal matter during or after the process of lifting the sifter device before proper disposal is achieved.

It is therefore an object of the present invention to provide a new and improved cat litter screening device which obviates many of the disadvantages and drawbacks of present screening devices. Another object is to provide a screening device of the type described herein which is embedded in situ beneath the surface of the litter material in the box in which the fecal matter only is collected for disposal by lifting the device clear of the litter box and the granular litter material within said box.

A further object is to provide a cat litter screening device which is simple and inexpensive to manufacture, so it will be readily available to cat owners. The litter screening device may be made from a resilient material of only moderate expense which can be reused for a relatively long product life. Alternatively, it may be made from a less expensive cellulose-based board material which, after a single or relatively few reuses, can be disposed of with the removed fecal matter.

Another object is to provide a cat litter screening device of the type described herein which is easier to use than conventional devices, which does not present an unsightly appearance when in use, which stirs up the litter material more completely for more effective urine absorption therein, and which more completely cleans the litter of fecal matter thereby to improve litter box hygiene and minimize any risk of infection.

SUMMARY OF THE INVENTION

The above stated objects are achieved in the invention cat litter box sifter tray which comprises (1) a rectangular tray bottom with perforations extending throughout the length and width dimensions of said tray bottom and (2) four side walls extending upwardly from a respective side edge of the rectangular tray bottom with perforations extending throughout the length and height dimensions of each side wall. Said objects are achieved further by a product design which permits the three-dimensional invention sifter tray to be manufactured as an essentially two-dimensional, flat piece which has extensions at each side edge of a central rectangle (which forms the rectangular tray bottom) permitting upward folding of each said extension to a point where the extensions are interconnectedly joined to each other at each corner of said rectangle (forming the four sides of the tray).

DESCRIPTION OF THE PREFERRED EMBODIMENT(S)

The litter sifter tray is manufactured as a flat sheet material from a semi-rigid (but, pliable), somewhat resilient material which permits a degree of bending while retaining its shape. (See FIG. 1.) The material of manufacture may be natural or synthetic. The preferred material is a synthetic polymeric material, such as polyethylene, permitting the litter sifter tray sheet to be injection molded. (Although more expensive to produce, the sheet may be stamped, as well.) Also, this nonabsorbent preferred material is not adversely affected by the cat's urine. Alternatively, the sheet may be stamped or cut from a paperboard product, which may be either sized or coated with a film, such as polyethylene or another polymer or a blend of polymers to protect the paper from (or inhibit the effect of contact with) the cat's urine. In addition to ease of manufacture, the flat sheet design for assembling the litter sifter (by the consumer-/user) provides advantages in packaging and shipping, as well as in-store stocking. Also, the choice between a more durable, plastic material and a less expensive, paperboard material provides the user the option of reusing the tray after disposing of removed fecal matter or disposing of the tray along with the removed fecal matter to minimize handling and, thereby, further reduce any risks of infection.

Figure 1:
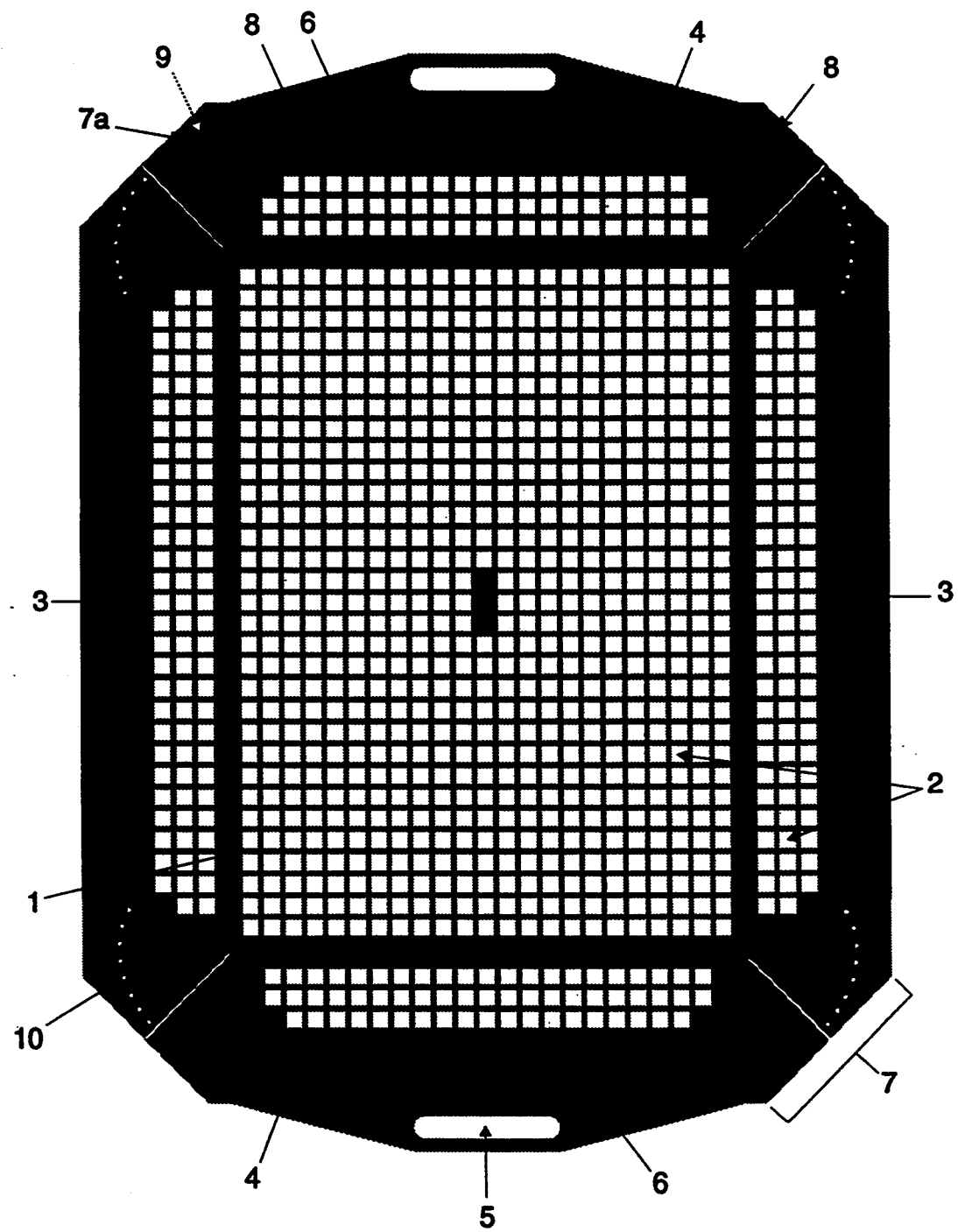
FIG. 1 is an overhead view of the invention litter sifter tray as manufactured and ready for side wall assembly.

Referring to FIG. 1, the litter sifter tray sheet is defined primarily by a rectangular tray bottom 1 with perforations 2 extending throughout the length and width dimensions of the tray bottom 1. The tray sheet is defined further by equal extensions 3 from each length dimension side edge of the rectangular tray bottom 1 and by equal extensions 4 from each width dimension side edge of the rectangular tray bottom 1. Extensions 3 and 4 also contain perforations 2. In a preferred embodiment, each width dimension extension 4 is provided with a larger, elongated slotted perforation 5, at a central position and near the edge of said extension away from the rectangular tray bottom 1, intended for use as a handle to facilitate removal of each successive litter sifter tray from the litter box. In a most preferred embodiment, handles 5 are located on the litter sifter tray sheet centrally positioned in abbreviated further extensions 6 from extensions 4, as shown in FIG. 1.

In one embodiment of the invention litter sifter tray sheet, opposing extensions 3 and opposing extensions 4 are bent upward from rectangular tray bottom 1 until the respective side edges of extensions 3 meet the respective side edges of extensions 4. With said respective side edges adjoining, extensions 3 and 4 are fixed in their upright positions by a connecting means at each corner of rectangular tray bottom 1. This embodiment may suffice for cat litter boxes with sides positioned at a right angle (90°) relative to their bottoms. Most litter box sides, however, exhibit some degree of slope from their bottom.

Figure 2:
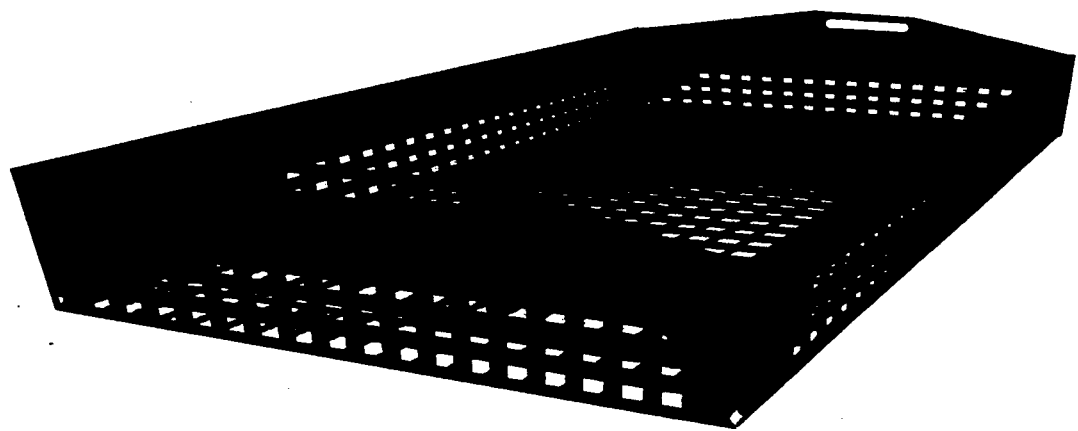
FIG. 2 is a perspective view of the invention litter sifter tray ready for use.
Figure 3:
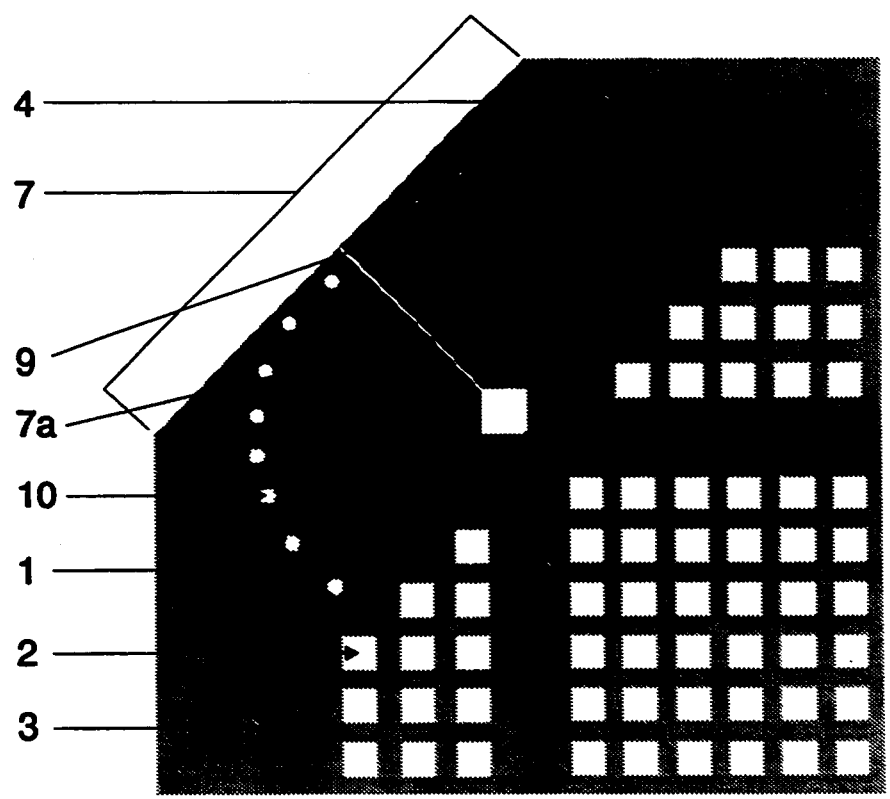
FIG. 3 is a close-up view of the tray corner fabrication to show the best known mode of interconnectable corner assembly for forming sides projecting upwardly from the rectangular bottom at various angles to conform to the walls of the particular litter box in which it may be used.

In the most preferred embodiment, as depicted in FIG. 1, the litter sifter tray sheet further includes corner sections 7 between each adjacent side edges of extension 3 and 4, which sections are inscribed or creased at regular intervals from a single point emanating from each respective corner of rectangular tray bottom 1, dividing said section 7 into multiple panels 8, to permit ease of folding each of said corner sections 7 upon adjustable upward positioning of extensions 3 and 4 relative to rectangular tray bottom 1. Each corner section 7 approximates an equilateral triangle, each half of which approximates a right triangle. One opposing right triangle (7a) in each corner section 7 is provided with a series of raised beads 9, and the other opposing right triangle in each corner section 7 is provided with a series of circular appertures 10 (i.e., holes) in alignment with and of a size to permit insertion of beads 9 therein (as shown in FIG. 3) whereas, by the selection of particular appertures 10 (FIGS. 1 and 3) for receiving particular beads 9, raised extensions 3 and 4 can be positioned to form the litter sifter tray sides projecting from litter sifter tray bottom 1 at various angles. In this preferred embodiment, the invention litter sifter tray of FIG. 2 is formed from the litter sifter tray sheet of FIG. 1 by bending extensions 3 and 4 upward from rectangular tray bottom 1.

After forming multiple litter sifter trays from litter sifter tray sheets, the trays are nested together and placed in a cat litter box. Granular litter material, such as sand or kitty litter, is poured into the cat litter box to cover the nested litter sifter trays. After the cat has deposited fecal matter into the litter box, but before the granular litter material has been rendered unusable, the topmost litter sifter tray can be removed from the litter box. Due to the design of the litter sifter tray, as described above, all of the fecal matter is removed (for easy disposal) while the granular litter material remains in the litter box.

It can be appreciated that the present invention litter sifter tray sheet and litter sifter tray assembled therefrom are well adapted to accomplish the objects and to obtain the ends and advantages mentioned herein. While a presently most preferred embodiment of the invention has been described for the purposes of this disclosure, numerous changes may be made which may be readily apparent to those skilled in the art and which are accomplished within the spirit of the invention disclosed and as defined in the claims appended hereto.

What is claimed is:

1. A litter sifter tray for selective removal of fecal matter from a cat litter box comprising a rectangular tray bottom having length and width dimensions, perforations extending throughout the length and width dimensions of the tray bottom, four interconnected side walls having length and width dimensions, each of said side walls extending upwardly from a respective side edge of the rectangular tray bottom, said perforations also extending throughout the length and width dimensions of each of said walls, and corner sections between adjacent side edges of said walls which sections include inscriptions or creases at regular intervals emanating from each respective corner of the tray bottom providing a series of triangular panels within each corner section, wherein one half of said panels are provided with a series of raised beads and the opposing half of said panels within each corner section are provided with a series of circular apertures in alignment with and of a size to permit insertion of said beads therein to allow adjustable upward positioning of said side walls.

2. The litter sifter tray of claim 1 further comprising means for lifting the tray in the form of handles provided by elongated slotted perforations located in two opposing side walls.

3. The litter sifter tray of claim 2 constructed from a polymeric material.

4. The litter sifter tray of claim 3 wherein the polymeric material is polyethylene.

5. The litter sifter tray of claim 2 constructed from a paperboard material.

6. The litter sifter tray of claim 5 wherein the paperboard material is selected from the group consisting of sized paperboard and coated paperboard.

7. A litter sifter tray sheet for constructing a litter sifter tray comprising a sheet material having a centrally located larger rectangular segment with length and width dimensions, smaller rectangular segments extending from each side edge of said larger rectangular segment, perforations extending essentially throughout the length and width dimensions of the larger rectangular segment and the small rectangular segments, and corner sections between adjacent side edges of said smaller rectangular segments include inscriptions or creases at regular intervals emanating from each respective corner of the larger rectangular segment providing a series of triangular panels within each corner section, wherein one half of said panels are provided with a series of raised beads and the opposing half of said panels within each corner section are provided with a series of circular apertures in alignment with and of a size to permit insertion of said beads therein to allow adjustable upward positioning of said side smaller rectangular segments.

8. The litter sifter tray sheet of claim 7 further comprising elongated, slotted perforations located on two opposing smaller rectangular segments on the length dimensions of said smaller rectangular segments farthest from the respective side edge of the larger rectangular segment wherein the elongation of said perforation is parallel to said length dimension.

9. The litter sifter tray sheet of claim 8 wherein the opposing smaller rectangular segments extend from the width dimensions of the larger rectangular segment.

10. The litter sifter tray sheet of claim 7 further comprising abbreviated further extension segments extending from the length dimensions of two opposing smaller rectangular segments farthest away from the respective side edge of the larger rectangular segment, said further extension segments being provided with elongated, slotted perforations wherein the elongation of said perforation is parallel to said length dimension.

11. The litter sifter tray sheet of claim 10 wherein the opposing smaller rectangular segments are extended from the width dimensions of the larger rectangular segment.

12. The litter sifter tray sheet of claim 7 wherein the sheet material is a polymeric material.

13. The litter sifter tray sheet of claim 12 wherein the polymeric material is polyethylene.

14. The litter sifter tray sheet of claim 7 wherein the sheet material is a paperboard material.

15. The litter sifter tray sheet of claim 14 wherein the paperboard material is selected from the group consisting of sized paperboard and coated paperboard.

* * * * *